United States Patent [19]

Hergenrother

[11] Patent Number: 4,524,040
[45] Date of Patent: Jun. 18, 1985

[54] PROCESS FOR MAKING COATED GLASS FIBER REINFORCED COMPOSITES

[75] Inventor: William L. Hergenrother, Akron, Ohio

[73] Assignee: The Firestone Tire & Rubber Company, Akron, Ohio

[21] Appl. No.: 520,388

[22] Filed: Aug. 4, 1983

[51] Int. Cl.³ .................... B32B 9/00; B05D 3/02; B29G 5/00; D04H 1/58
[52] U.S. Cl. .................... 264/136; 264/137; 264/236; 264/257; 427/389.8; 428/288; 428/392; 523/209; 524/494
[58] Field of Search ........... 428/375, 389, 378, 394, 428/430, 392, 288; 521/85, 55, 105, 107, 108, 122, 130, 419; 525/55, 105, 122, 130, 419, 285; 204/159.14, 159.22, 159.23; 65/3.43; 523/202, 209, 444, 467, 513, 527; 524/494; 264/134, 136, 137, 236, 257, 258; 427/213.32, 389.8, 215

[56] References Cited

U.S. PATENT DOCUMENTS

| | | | |
|---|---|---|---|
| 3,264,156 | 8/1966 | Vanderbilt et al. | 156/334 X |
| 3,337,391 | 8/1967 | Clayton et al. | 428/441 |
| 3,414,432 | 12/1968 | Mertzweiler et al. | 428/441 |
| 3,416,990 | 12/1968 | Robinson, Jr. | 156/334 X |
| 3,546,184 | 12/1970 | Heidel et al. | 525/285 X |
| 3,689,446 | 9/1972 | Furuya et al. | 525/285 |
| 3,759,777 | 9/1973 | Lubowitz et al. | 156/334 X |
| 4,031,062 | 6/1977 | Shirayama et al. | 525/285 X |
| 4,082,817 | 6/1977 | Imaizumi et al. | 525/285 X |
| 4,161,571 | 7/1979 | Yasui et al. | 525/285 X |
| 4,318,960 | 3/1982 | McCombs et al. | 428/441 X |
| 4,423,177 | 12/1983 | Senatore | 525/285 |

*Primary Examiner*—Lorraine T. Kendell
*Attorney, Agent, or Firm*—Frank J. Troy, Sr.

[57] ABSTRACT

A composite which has a high flexural strength to density ratio and which is resistant to strength loss incident to exposure to water, is formed by reinforcing unsaturated thermosetting resin with glass fibers sized with selected maleic anhydride adduct of polybutadiene utilized in critical amounts.

12 Claims, No Drawings

4,524,040

PROCESS FOR MAKING COATED GLASS FIBER REINFORCED COMPOSITES

TECHNICAL FIELD

This invention relates to glass fiber reinforced plastic composites having high flexural strength to density ratio and having resistance to strength loss normally caused by exposure to moisture and/or humidity. The invention further relates to a method of making such composites. This invention further relates to size coated glass fibers for use in making the composites.

BACKGROUND OF THE INVENTION

There has been a continuing effort to replace metal components with lighter weight plastic components especially in motor vehicles and aircraft to reduce fuel consumption.

Glass fiber reinforced resin composites are being used for this purpose. These composites usually contain a binder to improve the interface, i.e. form a bond, between the glass fibers and the resin. The binder is typically applied as a size coating to the glass fibers. Conventionally, silane or titanate coupling agents are used for such size coating and they provide bonding by means of Si—O—Si and Si—O—Ti linkages. These linkages are thermally stable but on exposure to water, e.g. moisture and/or humidity, can hydrolyze and do not reform thereby causing loss of bonding to the reinforcement. Similarly cyclic stress, i.e. tensile stress caused by intermittent application of a load, e.g. during a revolution of the component, can cause a loss of this type of bonding. Even if an occurrence of exposure to moisture and/or humidity and/or cyclic stress does not cause failure, each exposure normally causes irreversible damage, and there is a cumulative effect. Thus, heretofore, composite material has not ordinarily replaced steel and other metals in parts, e.g. wheels for automobiles, normally encountering substantial exposure to moisture and/or humidity and/or cyclic stress.

McCombs et al. U.S. Pat. No. 4,318,960 discloses glass fiber reinforced plastics containing glass fibers with a size coating of maleic anhydride adduct of polybutadiene used in combination with organosilicon coupling agents. The adduct is formed in a free radical reaction in the presence of a free radical initiator. The presence of the free radical initiator produces insoluble adduct. It is therefore applied to the glass fibers from an emulsion whereby the distribution of the sizing agent normally lacks uniformity. Furthermore, it is applied in an amount to deposit a coating of 0.1 to 15% by weight. McCombs et al. does not disclose that its glass fiber reinforced plastics resist strength loss on exposure to moisture and/or humidity and/or cyclic stress.

SUMMARY OF THE INVENTION

It has now been discovered that a composite having a high flexural strength to density ratio and which is resistant to strength loss incident to exposure to water, e.g. in the form of moisture and/or humidity, and/or to cyclic stress is prepared by reinforcing cured unsaturated thermosetting resin with glass fibers sized with selected soluble maleic anhydride adduct of polybutadiene used in critical amounts.

The composite comprises cured unsaturated thermosetting resin reinforced by (i.e. having distributed therein) size coated glass fibers present in an amount ranging from about 20% to about 70% by weight of the composite.

The size coating on the glass fibers comprises maleic anhydride adduct of 1,2-polybutadiene. The polybutadiene has molecular weight of more than 10,000 and a crystallinity ranging from 0% to 50%. The adduct is soluble in organic solvent and thus can be uniformly applied as a solution. The amount of the adduct forming the size coating ranges from about 0.1 grams to about 6 grams per 100 grams of glass fibers. These amounts are critical since use of amounts of sizing less than about 0.1 grams per 100 grams of glass fibers or more than about 6 grams per 100 grams of glass fibers results in an unacceptably increased tendency toward failure at the interface.

The composites herein are made by a process comprising the steps of:

(a) forming the maleic anhydride adduct of 1,2-polybutadiene by reacting maleic anhydride with 1,2-polybutadiene having a number average molecular weight of more than 10,000 and a crystallinity ranging from 0% to 50%, said reaction being carried out under an inert atmosphere at a temperature ranging from about 150° C. to about 260° C. and in the absence of a free radical initiator, the weight ratio of polybutadiene to maleic anhydride ranging from about 100:1 to about 1.5:1;

(b) dissolving the adduct in powder form in an organic solvent;

(c) coating glass fibers with the solution produced in step (b) utilizing from about 0.1 grams to about 6 grams of adduct per hundred grams of glass fibers;

(d) evaporating the solvent to provide glass fibers size coated with adduct;

(e) admixing the size coated glass fibers with unsaturated thermosetting resin and curing agent, the size coated glass fibers being present in an amount ranging from about 20% to about 70% by weight of the admixture;

(f) curing to form a composite.

The step of forming the adduct under an inert atmosphere and in the absence of a free radical initiator, i.e. step (a), is critical. These conditions curb cross linking so that the adduct is readily dissolved in step (b) whereby it is easily and uniformly applied to provide an interface bond resistant to hydrolysis whereby the composite is resistant to strength loss normally caused by exposure to water.

DETAILED DESCRIPTION

The composites herein normally have a flexural strength, i.e. a break strength, ranging from about 25,000 to about 35,000 psi even after prolonged exposure to water. Such flexural strength approaches that of steel. The density of the composites is on the order of 1 to 2 grams per cubic centimeter while that of steel is around 8. Thus, the composites herein have a greater flexural strength to density ratio than steel so that thickness of composite parts can be increased compared to corresponding steel parts to increase strength to that of steel while still obtaining a weight decrease.

The composites herein normally have a flexural modulus, i.e. an initial resistance to bending, ranging from about $10^6$ to about $10^7$ psi compared to $2.8 \times 10^7$ psi for a piece of steel of the same thickness.

The composites herein also have excellent elongation properties and energy at break properties (e.g.

1.85–3.0% elongation and 400–600 psi for energy at break).

Not only do the composites herein resist loss of flexural strength on exposure to water, they also resist loss in respect to the other aforementioned strength properties (i.e. flexural modulus, % elongation, energy at break). The composites herein also resist loss in respect to the aforementioned strength properties on exposure to cyclic stress.

The strength figures herein are those determined according to ASTM testing procedure D-790.

The composites herein are excellent substitutes for metal in the fabrication of wheels for automobiles and of aircraft components.

In describing the composites and their size coated glass fiber reinforcing, we turn firstly to the particular maleic anhydride-polybutadiene adduct used in critical amounts to provide the size coating whereby the unique strength properties herein are obtained.

Some adducts of this type are described in Imaizumi et al. U.S. Pat. No. 4,082,817.

The polybutadiene constituent is referred to herein as 1,2-polybutadiene. The terminology 1,2-polybutadiene is used herein to include polybutadienes containing about 85% or more 1,2-polybutadiene with a remainder being 1,4-polybutadiene.

The 1,2-polybutadiene ordinarily can have a number average molecular weight up to about 200,000. The term "number average molecular weight" is used herein to mean a number average molecular weight determined from the intrinsic viscosity ($[\eta]$) of the polymer using the following equation:

$$[\eta] = 9.1 \times 10^{-5} \times Mn^{0.8}$$

wherein $[\eta]$ is an intrinsic viscosity measured in toluene at 30° C. and Mn is a number average molecular weight [see Y. Takeuchi, et al., "A New Thermoplastic Syndiotactic 1,2-Polybutadiene" in Coatings and Plastics Preprints, Vol. 34, No. 1, p. 123 (American Chemical Society) (April 1974)].

The 1,2-polybutadiene utilized is preferably amorphous.

The reaction of the 1,2-polybutadiene and maleic anhydride is preferably carried out with a weight ratio of 1,2-polybutadiene to maleic anhydride ranging from about 3:1 to about 2:1. The weight ratio used determines the number of milliequivalents of anhydride per gram of adduct.

The time of the reaction is temperature dependent with shorter times being utilized for higher temperatures. For example, times on the order of one hour are useful at the 260° C. temperature while reaction at 150° C. can take up to a day or more.

The reaction can be carried out either with or without solvent. When a solvent is utilized it preferably is a halogenated aromatic hydrocarbon such as, for example, monochlorobenzene, o-dichlorobenzene, or α-chloroaphthalene.

It is critical herein that the reaction be carried out under an inert atmosphere and in the absence of free radical initiators. The reaction is carried out in this way so as not to foster free radical formation. This is important because free radical formation fosters cross linking which in turn causes the adduct to be difficult to dissolve. A soluble adduct is critical herein so the adduct can be readily applied and evenly distributed from solution whereby the strength retention properties are obtained when the adduct is applied in the critical amounts stated herein.

Carrying out the reaction under an inert atmosphere involves excluding oxygen, e.g. by application of vacuum and/or purging with nitrogen or other unreactive gas and reacting under vacuum or nitrogen or other inert gas preferably in a system closed to oxygen entry.

It is highly preferred that the reaction be carried out in the presence of antioxidant to hinder the tendency of any residual oxygen which is present to cause free radical formation. Suitable antioxidants include, for example, hindered phenolics (e.g. that sold under the name Irgonox), dibutylparacresol, dibutylphenylcresol (e.g. that sold under the name Eastzone DB), and octyl substituted paraphenylenediamine (e.g. that sold under the name Eastzone 31).

The reaction ordinarily produces a brittle mass of reaction product. The brittle mass is ordinarily size reduced to form powder for ease of dissolving; this is readily carried out with impacting means.

Turning now to the dissolving step, the organic solvent should be one that does not react in non-reversible fashion with the anhydride. A preferred organic solvent for use herein in dissolving the powdered adduct is acetone. Other useful solvents include chloroform, ketones, ethers, tetrahydrofuran, dioxane, and aqueous tertiary amines. Alcohols are not useful solvents since they react with the anhydride in a non-reversible fashion.

In dissolving the adduct in the solvent, use of a small amount of solvent results in a viscous solution which is hard to handle while use of a large amount of solvent increases the evaporation load. Use of solvent to adduct ratio (volume basis) ranging from about 5:1 to about 15:1 provides good results with a ratio of about 8:1 to 12:1 being preferred.

The adduct solution is readily applied to coat glass fibers by passing the fibers through the solution as continuous filaments as they are produced. The adduct solution is also readily applied by admixing adduct solution with fibers already cut to length.

Evaporation of the solvent to provide glass fibers size coated with adduct is readily carried out by conventional drying methods, e.g. by exposing the solution coated fibers to vacuum under a hood or in a vacuum oven.

Preferably, the amount of adduct used to coat the glass fibers and forming the size coating ranges from about 1 gram to about three grams per hundred grams of glass fibers.

The glass fibers utilized are preferably in the form of bundles of glass fibers ranging from 0.5 to 1.5 inches in length.

The glass fibers utilized can be free from organosilane coupling agents but the benefit of the invention of resistance to strength loss normally caused by exposure to water is obtained despite the presence of such. This is important because some glass fibers are available from the manufacturer already treated with silane coupling agents, e.g. 0.5–2% by weight of the fibers of silane based coupling agents.

Turning now to the step where the size coated glass fibers are admixed with unsaturated thermosetting resin and curing agent, this is readily accomplished, for example, by placing the size coated glass fibers in a mold or other container and pouring therein the resin plus curing agent and any other additives. Preferably pressure is applied in the molding to close any air gaps between the fibers.

Preferably, the size coated glass fibers are present in the admixture in an amount ranging from about 30% to about 50% by weight of the admixture so as to be present in these amounts by weight of the composition.

The unsaturated thermosetting resin can be, for example, a vinyl ester resin having terminal unsaturation, for example, a resin having a structure as follows:

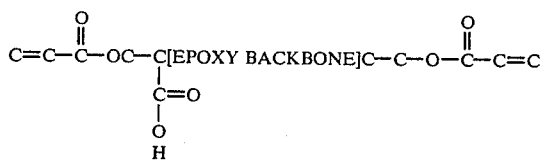

Alternatively, the unsaturated resin can be unsaturated polyester resin; these resins typically have their unsaturation contributed by interesterified unsaturated dicarboxylic acids, such as maleic acid. The unsaturated thermosetting resin can also be, for example, a high vinyl polybutadiene or a polar-nonpolar block polymer (e.g. where nylon or polyimide or polyurea or polyurethane forms the polar block and 1,2-polybutadiene forms the nonpolar block).

Preferably, the unsaturated thermosetting resin is a vinyl ester. A very suitable one in styrene is sold under the name Derakane 790 by Dow Chemical; Derakane 790 is described by the manufacturer as typically having the following properties: an acid number of 25; a kinematic viscosity, cks at 25° C. of 1200; a specific gravity of 1.03; and an SPI gel time in minutes at 180° F. of 30.

When a vinyl ester resin is utilized, a thickener is preferably included with it as is conventional in vinyl ester curing. Thus, in this case, the size coated glass fibers are admixed with vinyl ester resin, thickener and curing agent. The thickener can be, for example, magnesium oxide or calcium oxide. Thickening is carried out simply by including the thickener in the admixture and letting the admixture sit in the mold or container where the admixture is formed. Thickening is readily carried out, for example, in a day or two.

What curing system is utilized depends on what unsaturated thermosetting resin is utilized, and the appropriate curing systems are well known in the art.

For the vinyl ester resins preferred herein and for the unsaturated polyester resins, curing agent can be, for example, t-butyl perbenzoate, benzoyl peroxide, methyl ethyl ketone peroxide, or cyclohexanone peroxide. Curing vinyl ester resin with such curing agent can be carried out, for example, in the mold at a temperature ranging from about 60° C. to about 190° C. over a time period ranging from about 1 minute to about 4 hours with the time and temperature being selected based on the particular curing agent selected. With t-butyl perbenzoate, curing over a 10 minute period at 150° C. provides very satisfactory results.

Curing agents for the unsaturated thermosetting resins including polybutadiene include, for example, di-t-butylperoxide, α,α'-bis(t-butylperoxy)diisopropyl benzene, 2,5-dimethyl-2,5-(t-butylperoxy)hexane, and dicumyl peroxide.

The invention is illustrated in the following specific example.

EXAMPLE

Maleic anhydride adduct of 1,2-polybutadiene was prepared as follows: The materials were added in the proportion of 2 parts by weight amorphous polybutadiene to 1 part by weight maleic anhydride into two inch diameter tubes with the bottom sealed. Included in the materials added was antioxidant consisting by weight of 0.1 part dibutylphenylcresol (Eastzone DB) per 100 parts of polybutadiene and 0.01 part of octyl substituted paraphenylenediamine (Eastzone 31) per 100 parts of polybutadiene. The tubes were evacuated, then nitrogen purged, then sealed under vacuum, then heated in an oven at 175° C. for 20 hours. The reaction produced a brittle mass of adduct containing 2.8 milliequivalents of anhydride per gram.

The brittle masses of adduct were broken up using a hammer to provide powder.

The powder was dissolved in acetone to produce an adduct solution.

The adduct solution was applied to bundles of 1 inch glass fibers (formed from a continuous strand cut every inch with each filament in the strand having a diameter of about 10 microns with about 1000 filaments constituting the strand). The fibers utilized were sold under the designation 4225 by PPG Industries and are described by the manufacturer as having been treated with silane coupling agent that is compatible with peroxide cured unsaturated resins.

The solution application was carried out as follows: The solution and 60 grams of fiber bundles were placed in a 6×6×3 aluminum tray in relative amounts as set forth in the table below and drying to evaporate the solvent was carried out by drawing a vacuum under a hood for 16 hours, then heating at 60° C. in a vacuum oven for two hours.

Composite formation was carried out by forming an admixture of Derakane 790 (vinyl ester resin in styrene), magnesium oxide thickening agent and t-butyl perbenzoate curing agent and introducing 60 grams of this into the aluminum tray containing the adduct coated glass fibers. Thickening was allowed to occur for two days. Then curing was carried out for 10 minutes at 150° C.

Batches were made up with 1 gram of adduct per 60 grams of glass fibers (Run 1), no grams of adduct per 60 grams of glass fibers (Run 2), and 5 grams of adduct per 60 grams of glass fibers (Run 3). Run 1 is within the scope of the invention while Runs 2 and 3 are not. For each run testing was carried out on composite samples which were not exposed to water and also on composite samples which were submerged in boiling water for four weeks and tested after drying. Testing was carried out in accordance with ASTM testing procedure D-790.

The results are presented in the Table below where "No Water" means not exposed to water and where "Water Treated" means the aforedescribed boiling water treatment.

| COMPARISON TESTING | | | |
|---|---|---|---|
| | Run 1 | Run 2 | Run 3 |
| Flexural Strength X10$^{-3}$ (psi) | | | |
| No Water | 32.3 | 37.5 | 30.9 |
| Water Treated | 29.9 | 23.4 | 17.7 |
| Flexural Modulus X10$^{-6}$ | | | |
| No Water | 1.90 | 1.63 | 2.01 |

-continued

COMPARISON TESTING

|  | Run 1 | Run 2 | Run 3 |
|---|---|---|---|
| Water Treated | 1.84 | 1.71 | 1.22 |
| % Elongation |  |  |  |
| No Water | 2.42 | 2.92 | 2.03 |
| Water Treated | 2.03 | 1.61 | 2.30 |
| Energy at Break |  |  |  |
| (psi) |  |  |  |
| No Water | 479 | 608 | 357 |
| Water Treated | 496 | 207 | 243 |

As can be seen from the above, the invention (Run 1) provides the best overall results for the water-treated composite when compared to no size coating (Run 2) and too much size coating (Run 3).

Similar results of good strength properties retention after exposure to water are obtained when other vinyl ester resins are used in place of Derakane 790 or when other unsaturated thermosetting resins, e.g. high vinyl polybutadienes, are used in place of the Derakane, or when glass fibers free of silane are utilized.

While the foregoing describes certain preferred embodiments of the invention, modifications will be readily apparent to those skilled in the art. Thus, the scope of the invention is intended to be defined by the following claims.

I claim:

1. Process for forming a glass fiber reinforced composite having a high flexural strength to density ratio and having resistance to strength loss incident to exposure to water, said process comprising the steps of
    (a) forming a maleic anhydride adduct of 1,2-polybutadiene by reacting maleic anhydride with 1,2-polybutadiene having a number average molecular weight of more than 10,000 and a crystallinity ranging from 0% to 50%, said reaction being carried out under an inert atmosphere at a temperature ranging from about 150° C. to about 260° C. and in the absence of a free radical initiator, the weight ratio of polybutadiene to maleic anhydride ranging from about 100:1 to 1.5:1;
    (b) dissolving the adduct in powder form in an organic solvent;
    (c) coating glass fibers with the solution produced in step (b) utilizing from about 0.1 grams to about 6 grams of adduct per hundred grams of glass fibers;
    (d) evaporating the solvent to provide glass fibers size coated with adduct;
    (e) admixing the size coated glass fibers with unsaturated thermosetting resin and curing agent, the size coated glass fibers being present in an amount ranging from about 20% to about 70% by weight of the admixture;
    (f) curing to form a composite.

2. Process as recited in claim 1, wherein the adduct is formed in the presence of an antioxidant.

3. Process as recited in claim 1, wherein the glass fibers are coated utilizing from about 1 gram to about 3 grams of adduct per hundred grams of glass fibers.

4. Process as recited in claim 3, wherein the adduct is formed in the presence of an antioxidant.

5. Process as recited in claim 4, wherein the unsaturated thermosetting resin is a vinyl ester resin.

6. Process as recited in claim 5, wherein a thickening agent is included as an ingredient in step (e) and the resulting admixture is thickened before curing.

7. Process as recited in claim 6, wherein the thickening agent is magnesium oxide.

8. Process as recited in claim 6, wherein the weight ratio of polybutadiene to maleic anhydride utilized in forming the adduct ranges from about 3:1 to about 2:1.

9. Process as recited in claim 8, wherein the glass fibers are utilized in the form of bundles of glass fibers ranging from 0.5 to 1.5 inches in length and the size coated glass fibers in step (e) are present in an amount ranging from 30% to 50% by weight of the admixture.

10. Process as recited in claim 9, wherein the curing agent is t-butyl perbenzoate and curing is carried out at a temperature ranging from about 60° C. to about 190° C. for a time period ranging from about 1 minute to about 4 hours.

11. Process as recited in claim 4, wherein the polybutadiene utilized in forming the adduct is amorphous.

12. Process as recited in claim 4, wherein the solvent used in step (b) is acetone.

* * * * *